UNITED STATES PATENT OFFICE.

ARTHUR HAUSDÖRFER, OF ELBERFELD, AND CARL HEIDENREICH, OF LEVERKUSEN GERMANY, ASSIGNORS TO FARBENFABRIKEN VORM. FRIEDR. BAYER & CO., OF ELBERFELD, GERMANY, A CORPORATION OF GERMANY.

AZO TRIPHENYLMETHANE DYE.

980,521.  Specification of Letters Patent.  Patented Jan. 3, 1911.

No Drawing. Original application filed May 24, 1910, Serial No. 563,045. Divided and this application filed August 17, 1910. Serial No. 577,631.

*To all whom it may concern:*

Be it known that we, ARTHUR HAUSDÖRFER and CARL HEIDENREICH, citizens of the German Empire, residing, respectively at Elberfeld and Leverkusen, near Cologne, Germany, have invented a New Dye, of which the following is a specification.

The present application which is a divisional application of our application for Letters Patent Serial No. 563045, filed May 24th, 1910 relates to the production of a specific new azotriphenylmethane dyestuff which can be chromed after dyeing. The process for its production consists in condensing ortho-chloro-meta-aminobenzaldehyde with two molecules of ortho-cresotinic acid, diazotizing the resulting leuco compound, combining the diazo compound with 1-phenyl-3-methyl-5-pyrazolone and oxidizing the leuco-azo dyestuff.

The new dyestuff is in the shape of the free carboxylic acid after being dried and pulverized a scarlet-red powder which is soluble in caustic soda lye with a reddish color and which is soluble in concentrated sulfuric acid with a deep red color. The dye thus obtained dyes wool from acid baths yellow shades, green shades fast to potting being obtained on chroming.

In order to illustrate the new process more fully the following example is given, the parts being by weight:—90 parts of the leuco compound obtained from one molecule of ortho-chloro-meta-aminobenzaldehyde and two molecules of ortho-cresotinic acid are stirred up with 1000 parts of water, 30 parts of calcined sodium carbonate are added to obtain a solution and the leuco compound is precipitated again by adding a mixture of 125 parts of hydrochloric acid 19° Bé. and 500 parts of ice. It is then diazotized by means of a solution of 13.8 parts of sodium nitrite in water at a temperature of 5–10° C. The diazo compound thus obtained is introduced into a well cooled solution of 37 parts of 1-phenyl-3-methyl-5-pyrazolone in 600 parts of water and 29 parts of a 30 per cent. caustic soda lye and 50 parts of calcined sodium carbonate, while the solution is stirred until the combination is complete. When the separation of the sodium salt of the azo dyestuff is complete, the mass is filtered off and dried. The azo dye is, after being dried and pulverized, a yellow powder soluble in water with a yellow color.

To produce the coloring matter the leuco compound is dried and 140 parts of it are dissolved in 600 parts of concentrated sulfuric acid and to this solution while being stirred 14 parts of sodium nitrite in 200 parts of concentrated sulfuric acid are added. The mixture is then warmed to 50–60° C. until the quantity of the color does no longer increase. The dark red melt is poured on ice, the precipitate is filtered off and dried. The new dye is a scarlet-red powder scarcely soluble in water and soluble in dilute solutions of sodium carbonate with a yellowish-brown coloration. It dyes wool from acid baths yellow shades which on being treated with bichromate change into a bright yellowish-green fast to fulling, potting and light.

We claim:—

The herein described new dyestuff obtainable by reacting with the diazo compound of the triphenylmethane leuco compound derived from ortho-chloro-meta-amino-benzaldehyde and ortho-cresotinic acid upon 1-phenyl-3-methyl-5-pyrazolone and oxidizing the leuco compound, which dyestuff is in the shape of the free carboxylic acid after being dried and pulverized a scarlet-red powder scarcely soluble in water and soluble in dilute solutions of sodium carbonate with a yellowish-brown coloration; dyeing wool from acid baths yellow shades which on being treated with bichromate change into a bright yellowish-green fast to fulling, potting and light, substantially as described.

In testimony whereof we have hereunto set our hands in the presence of two subscribing witnesses.

ARTHUR HAUSDÖRFER. [L. S.]
CARL HEIDENREICH. [L. S.]

Witnesses:
CHAS. J. WRIGHT.
ALFRED HENKEL.